United States Patent [19]

Hart

[11] Patent Number: 4,774,116

[45] Date of Patent: Sep. 27, 1988

[54] SOLVENTLESS JOINT FOR PLASTIC

[75] Inventor: Charles G. Hart, Carpinteria, Calif.

[73] Assignee: Aluminum Filter Company, Carpinteria, Calif.

[21] Appl. No.: 64,743

[22] Filed: Jun. 22, 1987

[51] Int. Cl.⁴ .............................................. B32B 3/06
[52] U.S. Cl. ........................................ 428/57; 428/61;
156/92; 29/525.1
[58] Field of Search ......................... 428/58, 61, 57;
156/304.3, 304.5, 92, 91; 29/526 R Primary Examiner—Alexander S. Thomas
Attorney, Agent, or Firm—Donald A. Streck

[57] ABSTRACT

A low labor-intensive method and construction for joining first and second planar sheets of plastic at respective edges thereof at right angles to one another without the use of adhesives or solvents. A first lip is formed extending along the edge to be joined of the first planar sheet at right angles thereto. A second lip is formed extending along the edge to be joined of the first planar sheet at right angles thereto. A plurality of guide pins extending outward from the first lip along the length thereof and perpendicular thereto. A plurality of guide pin receiving blocks are formed disposed between the second lip and the second sheet along the length of the edge thereof and disposed to be opposite one of the guide pins when the first and second edges are abutted with the first lip abutting the second sheet and with the inner and outer edges of the second lip parallel to the outer edge of the first lip. The guide pin receiving blocks each has a guide pin receiving bore therein aligned for receiving a respective one of the guide pins. A plurality of staple receiving blocks are formed disposed intermediate the guide pins between the first lip of the first sheet along the length of the edge thereof and sized to receive and hold the legs of a U-shaped staple therein. Finally, a plurality of staple gun alignment guides are formed disposed between the second lip of the second sheet along the length of the edge thereof and opposite ones of the staple receiving blocks. The staple gun alignment guides are positioned to receive and contact the sides and inner end of a staple gun and position the gun to insert a staple into a staple receiving block disposed opposite thereto in horizontal and vertical alignment therewith. To assemble such a joint, the guide pins are inserted into the bores to place the two sheets in alignment for fastening. A staple gun is inserted into each of the staple gun alignment guides and a staple driven through the second sheet into the staple receiving block opposite.

14 Claims, 4 Drawing Sheets

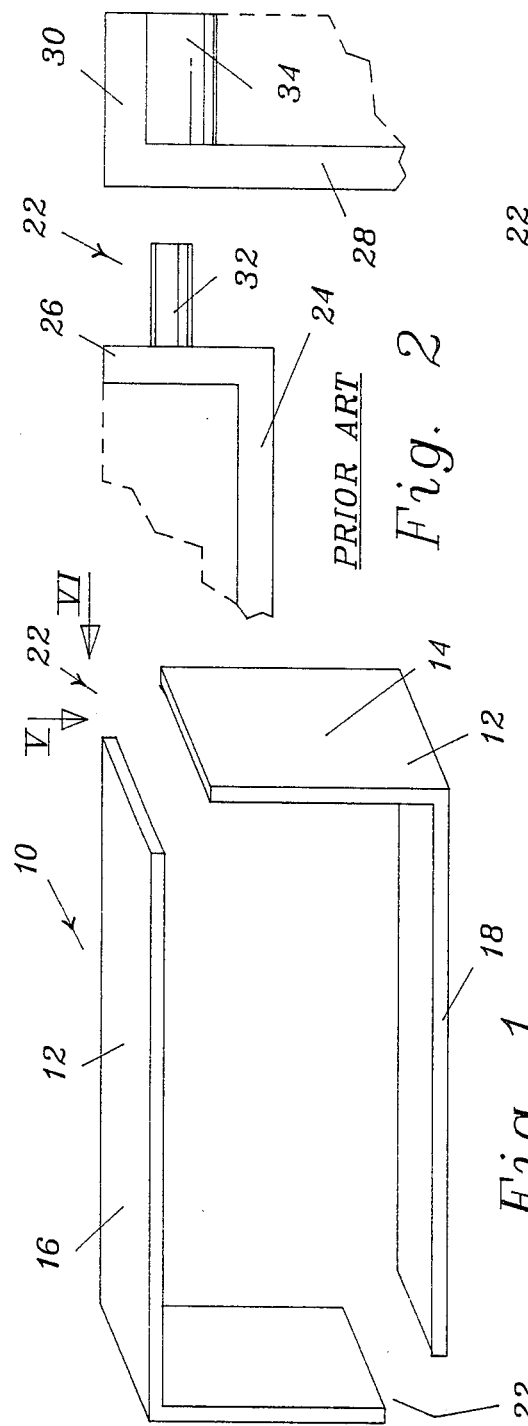

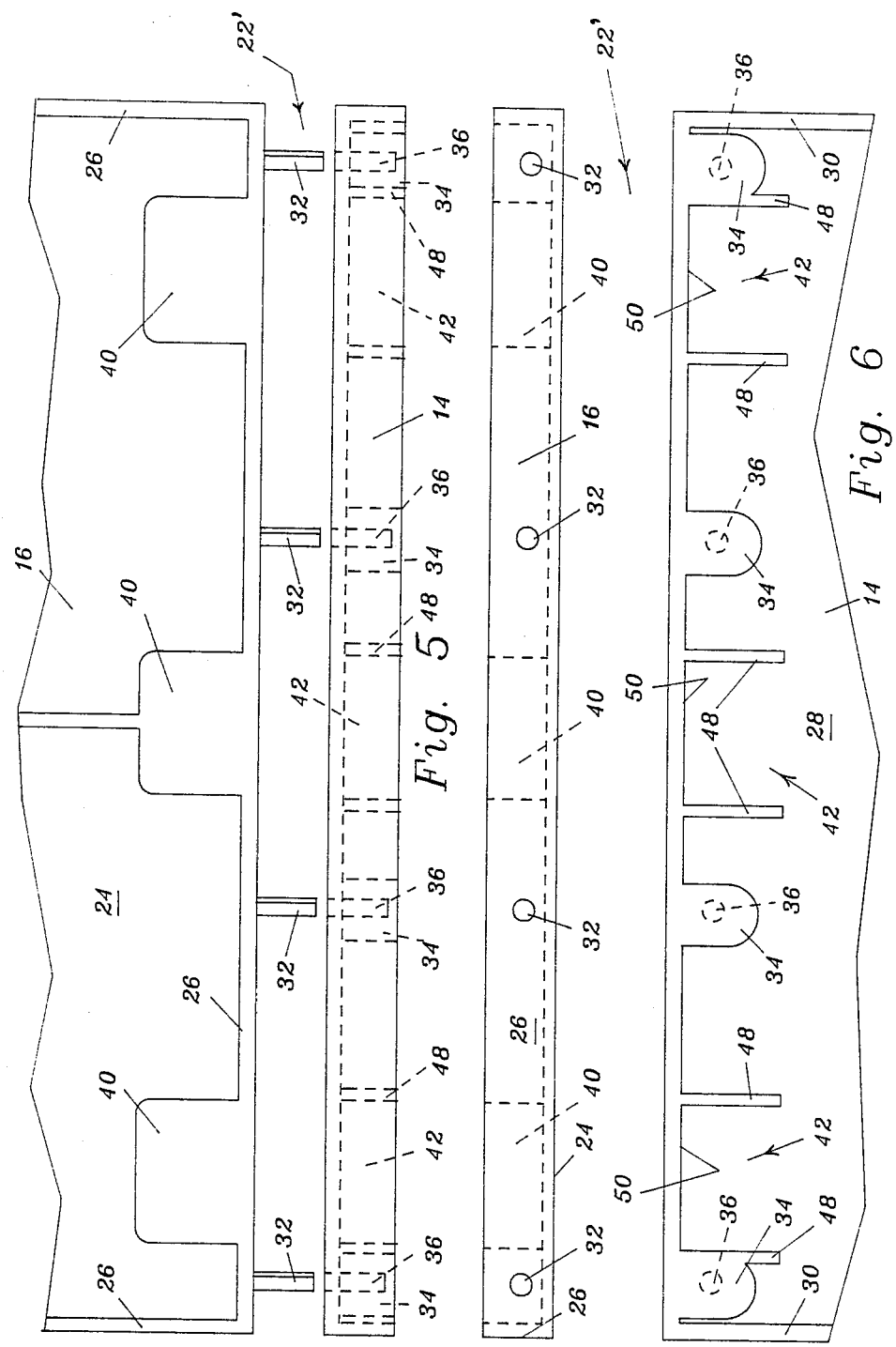

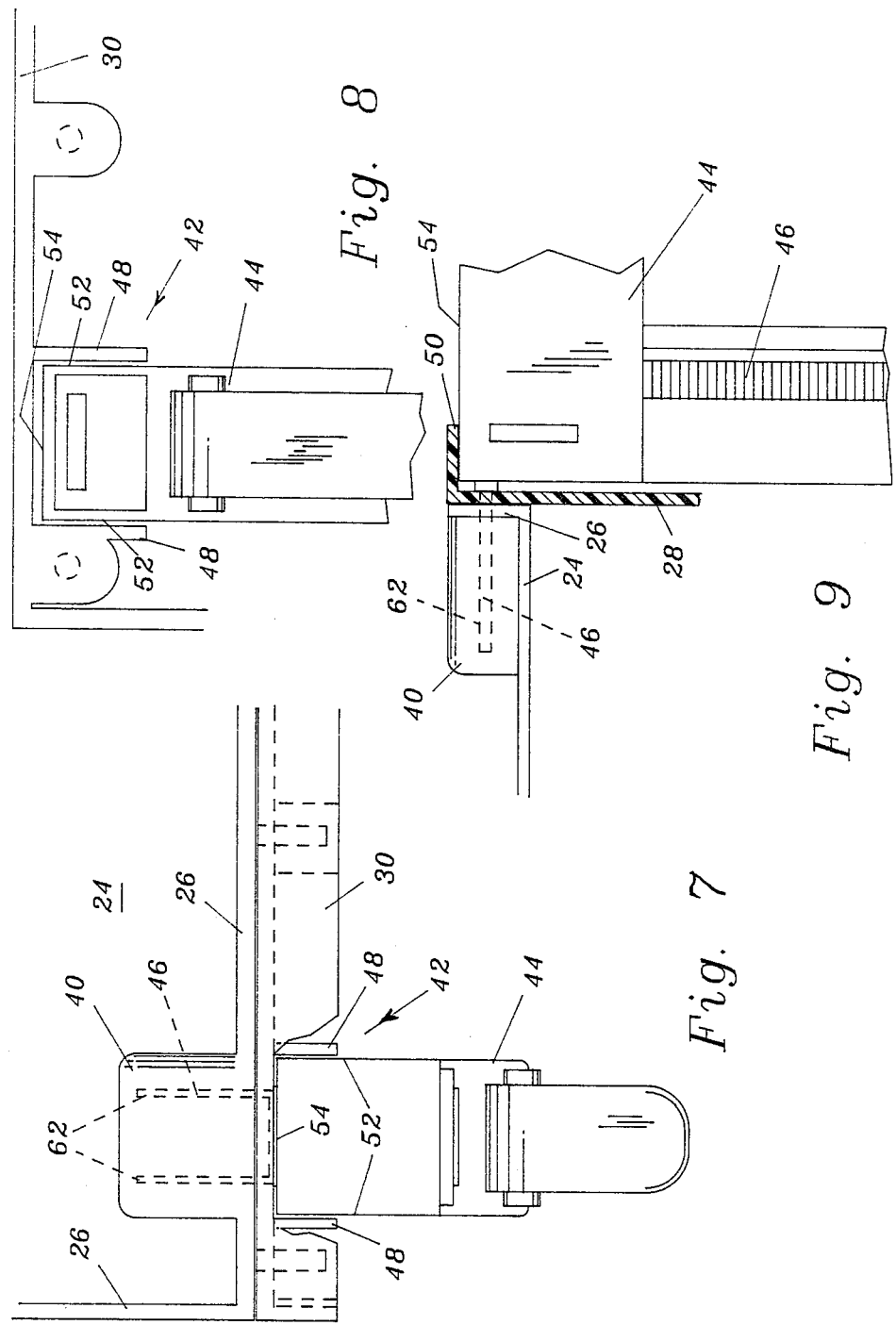

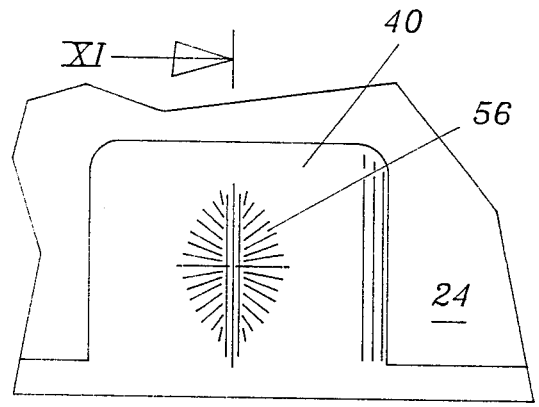
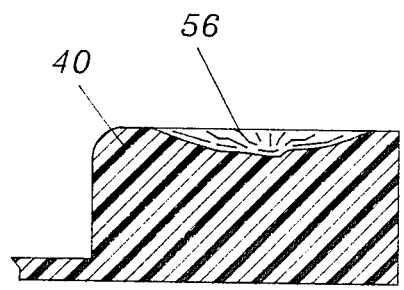
Fig. 10   Fig. 11
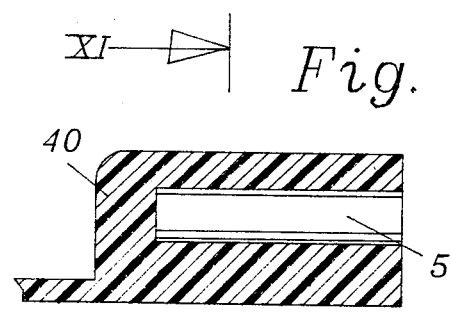
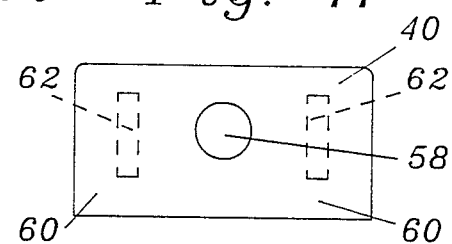
Fig. 12   Fig. 13
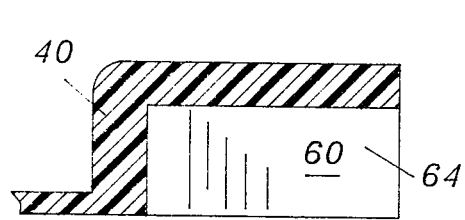
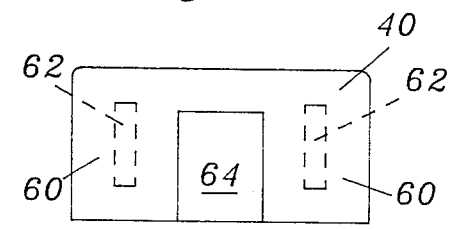
Fig. 14   Fig. 15

SOLVENTLESS JOINT FOR PLASTIC

BACKGROUND OF THE INVENTION

The present invention relates to methods and apparatus for joining planar plastic members at corners and, more particularly, to an improved solventless joint for plastic wherein conventional glue and solvent adhesion of the joint is replaced with stapling.

The side members of an air filter housing of conventional construction as manufactured and sold by the assignee of this application is shown in simplified form in FIG. 1 and labelled therein as 10. The housing 10 comprises two L-shaped planar plastic members 12 which, when joined opposite edge to opposite edge, form the ends 14, top 16, and bottom 18 of the housing 10. While not important to the present invention, a pair of rectangular grills (not shown) are fit into grooves (also not shown) provided on the inner surfaces of the L-shaped members 12 adjacent the edges and an air filtering element (not shown) is also assembled into the housing 10 at the time of assembly.

A detailed cutaway side view of a prior art joint 22 as where the top 16 of one L-shaped member 12 is attached to the end 14 of the other L-shaped member 12 is shown in FIGS. 2–4. The top 16 is generally planar and made of a thin, tough sheet 24 of plastic. A planar lip 26 surrounds the sheet 24 at right angles thereto as shown in FIG. 2. The end 14 is of similar construction again being generally planar and made of a thin, tough sheet 28 of plastic. A planar lip 30 again surrounds the sheet 28 at right angles thereto as also shown in FIG. 2. A plurality of cylindrical guide pins 32 extend outward perpendicular to the lip 26 along the length of the joint 22. A plurality of guide pin receiving blocks 34 are molded into the area under lip 30 behind the sheet 28 opposite the guide pins 32. As best seen in the cutaway views of FIG. 3 and 4, the guide pin receiving blocks 34 each have a hole 36 formed therein for receiving the guide pins 32. It should be noted at this point that the construction being described herein (both as to the prior art and the present invention hereinafter) is accomplished by injection molding of the parts. Thus, the two L-shaped members 12 and the two grills 20 are each of unitary construction; that is, there are only four parts in the air filter housing 10 and two9 joints of concern.

Turning now with particularity to FIGS. 3 and 4, at the time of assembly, the face of lip 26 having the guide pins 32 extending outward therefrom may be coated with an adhesive 38 as depicted in FIG. 3. As an alternative, the opposed surfaces to be joined may be coated with a plastic solvent such as that referred to as MEK which causes temporary softening of the surfaces and subsequent bonding thereof. The parts are then pressed together as depicted in FIG. 4. The guide pins 32 are received by the holes 36 to align the top 16 with the end 14 both vertically and laterally. In principle, such prior art joint construction is satisfactory. In commercial application, however, such prior art joint construction has numerous shortcomings. First, it is very labor intensive. The adhesive 38 must be applied and then the components assembled before the adhesive 38 sets up. If one of the components is mis-fit and the adhesive 38 (or solvent) is of a rapid drying variety, the error may not be correctable without destroying the joint 22. If a slower drying adhesive or solvent is employed, the joints 22 must be held together until the adhesive sets up or the solvent softened plastic hardens sufficiently to hold together; if not, the joint 22 may move out of position and set up in a mis-fit state. A low adhesion adhesive or solvent puts much of the physical strength of the joint 22 on the guide pins 32—which were designed for guidance during assembly only, not strength. As a result, if the housing 10 is bumped or dropped, the pins 32 at one or both joints 22 may shear off, thus just as effectively destroying the joint 22.

As an additional consideration, there are certain applications for a plastic articles (such as the air filter housing for which the present invention was developed) where the use of adhesives and solvents is undesirable for various reasons such as sanitation, potential odor, etc.

Wherefore, it is the object of the present invention to provide a solventless joint construction and method of assembly for use in joining planar plastic members at corners such as in the case of hollow plastic housings for air filter housings, and the like, which is strong and of low labor intensity.

SUMMARY

The foregoing objective has been achieved by the joint construction of the present invention for allowing the joining of first and second planar sheets of plastic at respective edges thereof at right angles to one another comprising, a first lip extending along the edge to be joined of the first planar sheet at right angles thereto, the first lip having an inner edge joined to the first sheet and an outer edge opposite the inner edge thereof; a second lip extending along the edge to be joined of the first planar sheet at right angles thereto, the second lip having an inner edge joined to the second sheet and an outer edge opposite the inner edge thereof; a plurality of guide pins extending outward from the first lip along the length thereof and perpendicular thereto; a plurality of guide pin receiving blocks disposed between the second lip and the second sheet along the length of the edge thereof, the guide pin receiving blocks each being disposed to be opposite one of the guide pins when the first and second edges are abutted with the first lip abutting the second sheet and with the inner and outer edges of the second lip parallel to the outer edge of the first lip, the guide pin receiving blocks each having a guide pin receiving bore therein aligned for receiving a respective one of the guide pins therein; a plurality of staple receiving blocks disposed intermediate the guide pins between the first lip of the first sheet along the length of the edge thereto, the staple receiving blocks being sized to receive and hold the legs of a U-shaped staple therein; and, a plurality of staple gun alignment guides disposed between the second lip of the second sheet along the length of the edge thereof, the staple gun alignment guides each being disposed to be opposite one of the staple receiving blocks when the first and second edges are abutted with the first lip abutting the second sheet and with the inner and outer edges of the second lip parallel to the outer edge of the first lip, the staple gun alignment guides being positioned to receive and contact the sides and inner end of a staple gun and position the gun to insert a staple into a the staple receiving block disposed opposite thereto in horizontal and vertical alignment therewith.

To easily assemble a housing, for example, including solventless joints cnstructed as described above, the guide pins are inserted into the holes provided therefore to put the joint into alignment and then a staple gun is inserted into each of the guides one at a time and a staple driven repeatably and accurately into the receiving block opposite to hold the joint firmly, but removably, together.

DESCRIPTION OF THE DRAWINGS

FIG. 1 is a simplified perspective view of the L-shaped side members of an air filter housing as wherein the present invention has been employed commercially.

FIG. 2 is a detailed cutaway side view of a prior art joint as employed in housings constructed in the manner of the housing of FIG. 1.

FIG. 3 shows the joint of FIG. 2 prepared for adhesive or solvent bonding assembly.

FIG. 4 shows the joint of FIG. 3 following assembly.

FIG. 5 is a top view of a solventless joint according to the present invention as in the area indicated as V in FIG. 1.

FIG. 6 is an end view of a solventless joint according to the present invention as in the area indicated as VI in FIG. 1.

FIG. 7 is a top view of an assembled solventless joint according to the present invention as in FIGS. 5 and 6 showing the manner of repeatedly and accurately guiding a stapler into its proper position for fastening the joint.

FIG. 8 is a side view of an assembled joint according to the present invention as in FIGS. 5 and 6 showing the manner of repeatedly and accurately guiding a stapler into its proper position for fastening the joint.

FIG. 9 is a side view at 90° to the view of FIG. 8 showing an assembled solventless joint according to the present invention as in FIGS. 5 and 6 and showing the manner of repeatedly and accurately guiding a stapler into its proper position for fastening the joint.

FIG. 10 is a top view of a staple receiving block as employed in the solventless joint construction of the present invention showing a problem associated therewith to be solved.

FIG. 11 is a cutaway side view of the staple receiving block of FIG. 10.

FIG. 12 is a cutaway side view of a staple receiving block modified in a first manner to present the problem of FIGS. 10 and 11.

FIG. 13 is an end view of the staple receiving block of FIG. 12.

FIG. 14 is a cutaway side view of a staple receiving block modified in a second and preferred manner to prevent the problem of FIGS. 10 and 11.

FIG. 15 is an end view of the staple receiving block of FIG. 14.

DESCRIPTION OF THE PREFERRED EMBODIMENT

A solventless joint 22' for use in an air filter housing 10 assembled according to the present invention and as manufactured by the assignee of this application is shown in FIGS. 5 and 6 prior to assembly in top and side views, respectively. Portions corresponding to the prior art construction previously described with respect to FIGS. 1-4 are marked with like numerals. As can be seen, the guide pins 32 and guide pin receiving blocks 34 are retained—but exclusively for the positioning function. To achieve the objective of the present invention, staple receiving blocks 40 are formed along the length of the joint 22' between the lip 26 and sheet 28 of the top 16. Additionally, staple gun receiving guides 42 are formed into the side 14 opposite respective ones of the staple receiving blocks 40 in a manner to be described in greater detail shortly.

Turning now to FIGS. 7-9, a portion of the solventless joint 22' of the present invention is shown in greater detail in the process of being assembled. As with the prior art adhesive/solvent-bonding joint 22 of FIGS. 2-4, the joint 22' is first pushed into aligned engagement by inserting the guide pins 32 into the holes 36 of the guide pin receiving blocks 34. Note, however, that no adhesive or solvent is used with the present invention. Rather, a staple gun 44 is inserted into each of the staple gun receiving guides 42 and a U-shaped staple 46 driven through the end 14 and lip 26 into the staple receiving block 40 opposite. Note that the staple gun receiving guides 42, in each case, comprise a pair of spaced side members 48 and a top stop 50 formed as part of the lip 30 between the side members 48. The side members 48 are positioned to receive the sides 52 of the staple gun 44 to centrally position the staple horizontally within the staple receiving block 40. In similar manner, the top stop 50 is positioned as best seen in the partially cutaway side view of FIG. 9. As with the side members 48, the top stop 50 is positioned to receive the end 54 of the staple gun 44 to centrally position the staple 46 vertically within the staple receiving block 40.

Turning now to FIGS. 10-15, a problem encountered by the applicants herein and their manner of overcoming it will now be described.

As illustrated in FIG. 10 and 11, when the staple receiving blocks 40 were molded as a single unit as part of the unitary molding of the L-shaped members 12 and were of sufficient size to accept and hold the staples 46, there was shrinkage and deformation as indicated by the area designated as 56 in the figures. In some cases, the deformation at 56 was sufficient to deform the entire lip 26 and the sheet 24 so that the parts could not be assembled. Even where deformation was not that extreme, the deformed area 56 was such as to render the housings 10 esthetically unacceptable from a commercial point of view. This problem was solved in the manner depicted in FIGS. 12 and 13 in one embodiment and in FIGS. 14 and 15 in a second embodiment. In the embodiment of FIGS. 12 and 13, a relief bore 58 is formed longitudinally into the staple receiving blocks 40 so as to be horizontally and vertically centrally located and, thereby, effectively divide the majority of the block 40 into two sub-blocks 60 of sufficiently smaller volume each that the shrinkage and deformation problem was eliminated. Each of the sub-blocks 60 is adpated to receive and hold one leg 62 of a staple 46.

The second, and preferred, embodiment is shown in FIGS. 14 and 15 wherein a relief slot 64 is formed into the blocks 40 from the inner surface thereof. The slot 64 still forms the sub-blocks 60 into the blocks 40, but is easier to mold and is unseen when the joint 22' is assembled.

As should be appreciated from the foregoing description, the solventless joint of the present invention is of low labor intensity during construction of the air filter housings 10 (or any similarly constructed plastic device) since the attachment of the two halves of the joint is virtually instantaneous. The person effecting the assembly is automatically guided to form a perfect point of attachment at each of the staple receiving blocks by virtue of the receiving guides 42 and the top stop 50. Moreover, if necessary, the resultant solventless joint 22' can be disassembled without damage thereto and then be reassembled just as quickly and just as firmly once again in the same manner.

Wherefore, having thus described our invention, we claim:

1. A solventless joint construction for the joining of first and second planar sheets of plastic at respective edges thereof at right angles to one another comprising:
   (a) a first lip extending along the edge to be joined of the first planar sheet at right angles thereto, said first lip having an inner edge joined to the first sheet and an outer edge opposite said inner edge thereof;
   (b) a second lip extending along the edge to be joined of the second planar sheet at right angles thereto, said second lip having an inner edge joined to the second sheet and an outer edge opposite said inner edge thereof said first and second edges being abutted with said first lip abutting the second sheet and with said inner and outer edges of said second lip parallel to said outer edge of said first lip;
   (c) a plurality of guide pins extending outward from said first lip along the length thereof and perpendicular thereto;
   (d) a plurality of guide pin receiving blocks disposed between said second lip and the second sheet along the length of the edge thereof, said guide pin receiving blocks each being disposed to be oppostie one of said guide pins, said guide pin receiving blocks each having a guide pin receiving bore therein aligned with and containing a respective one of said guide pins therein;
   (e) a plurality of staple receiving blocks disposed intermediate said guide pins behind said first lip of the first sheet along the length of the edge thereof, said staple receiving blocks being sized to receive and hold the legs of a U-shaped staple therein;
   (f) a plurality of staple gun alignment guides disposed between said second lip of the second sheet along the length of the edge thereof, said staple gun alignment guides each being disposed to be opposite one of said staple receiving blocks, said staple gun alignment guides being positioned to receive and contact the sides and inner end of a staple gun and position said gun to insert a staple into a said staple receiving block disposed opposite thereto in horizontal and vertical alignment therwith; and,
   (g) a plurality of U-shaped staples disposed with the legs thereof passing through said second lip and into respective ones of said staple receiving blocks.

2. The solventless joint construction of claim 1 wherein;
   said staple receiving blocks each have shrinkage relief and deformation prevention means incorporated therein for subdividing said block into sub-blocks each holding one leg of a said staple and being of sufficiently small volume as to resist deformation from shrinkage during cooling after molding.

3. The solventless joint construction of claim 2 wherein:
   said shrinkage relief and deformation prevention means comprises a longitudinal bore in each of said staple receiving blocks.

4. The solventless joint construction of claim 2 wherein:
   said shrinkage relief and deformation prevention means comprises a longitudinal slot in each of said staple receiving blocks.

5. The method of joining first and second planar sheets of plastic at respective edges thereof at right angles to one another without the use of adhesive or solvent comprising the steps of:
   (a) forming a first lip extending along the edge to be joined of the first planar sheet at right angles thereto, the first lip having an inner edge joined to the first sheet and an outer edge opposite the inner edge thereof;
   (b) forming a second lip extending along the edge to be joined of the second planar sheet at right angles thereto, the second lip having an inner edge joined to the second sheet and an outer edge opposite the inner edge thereof;
   (c) forming a plurality of guide pins extending outward from the first lip along the length thereof and perpendicular thereto;
   (d) forming a plurality of guide pin receiving blocks disposed between the second lip and the second sheet along the length of the edge thereof, the guide pin receiving blocks each being disposed to be opposite one of the guide pins when the first and second edges are abutted with the first lip abutting the second sheet and with the inner and outer edges of the second lip parallel to the outer edge of the first lip, the guide pin receiving blocks each having a guide pin receiving bore therein aligned for receiving a respective one of the guide pins therein;
   (e) forming a plurality of staple receiving blocks disposed intermediate the guide pins between the first lip of the first sheet along the length of the edge thereof, the staple receiving blocks being sized to receive and hold the legs of a U-shaped staple therein;
   (f) forming a plurality of staple gun alignment guides disposed between the second lip of the second sheet along the length of the edge thereof, the staple gun alignment guides each being disposed to be opposite one of the staple receiving blocks when the first and second edges are abutted with the first lip abutting the second sheet and with the inner and outer edges of the second lip parallel to the outer edge of the first lip, the staple gun alignment guides being positioned to receive and contact the sides and inner end of a staple gun and position the gun to insert a staple into a the staple receiving block disposed opposite thereto in horizontal and vertical alignment therewith;
   (g) inserting the guide pins into the bores in the guide pin receiving blocks to place the two sheets in alignment for fastening with the first lip abutting the second sheet and with the inner and outer edges of the second lip parallel to the outer edge of the first lip; and,
   (h) inserting a staple gun into each of the staple gun alignment guides and driving a staple through the second sheet into the staple receiving block opposite.

6. The method of claim 5 wherein:
   said step (e) of forming a plurality of staple receiving blocks includes forming shrinkage relief and deformation prevention means into each block to subdivide the block into sub-blocks each adapted to receive and hold one leg of a staple and of sufficiently small volume as to resist deformation from shrinkage during cooling after formation.

7. In a joint constructon for the joining of first and second planar sheets of plastic at respective edges thereof at right angles to one another including a first lip extending along the edge to be joined of the first planar sheet at right angles thereto, the first lip having an inner edge joined to the first sheet and an outer edge opposite the inner edge thereof and including a second lip extending along the edge to be joined of the second planar sheet at right angles thereto, the second lip having an inner edge joined to the second sheet and an outer edge opposite the inner edge thereof and further including a plurality of guide pins extending outward from the first lip along the length thereof and perpendicular thereto and a plurality of guide pin receiving blocks disposed between the second lip and the second sheet along the length of the edge thereof, the guide pin receiving blocks each being disposed to be opposite one of the guide pins when the first and second edges are abutted with the first lip abutting the second sheet and with the inner and outer edges of the second lip parallel to the outer edge of the first lip, the guide pin receiving blocks each having a guide pin receiving bore therein aligned for receiving a respective one of the guide pins therein, the improvement to permit solventless assembly of the join comprising:

(a) a plurality of staple receiving blocks disposed intermediate the guide pins behind the first lip of the first sheet along the length of the edge thereof, said staple receiving blocks being sized to receive and hold the legs of a U-shaped staple therein;

(b) a plurality of staple gun alignment guides disposed between the second lip of the second sheet along the length of the edge thereof, said staple gun alignment guides each being disposed to be opposite one of said staple receiving blocks when the first and second edges are abutted with the first lip abutting the second sheet and with the inner and outer edges of the second lip parallel to the outer edge of the first lip, said staple gun alignment guides being positioned to receive and contact the sides and inner end of a staple gun and position said gun to insert a staple into a said staple receiving block disposed opposite thereto in horizontal and vertical alignment therewith;

(c) the first and second edges being abutted with the first lip abutting the second sheet and with the inner and outer edges of the second lip parallel to the outer edge of the first lip;

(d) the guide pin receiving block receiving bores each having a guide pin disposed therein; and, (e) a plurality of U-shaped staples disposed with the legs thereof passing through the second lip and into respective ones of said staple receiving blocks.

8. The improvement to a joint construction of claim 7 wherein:

said staple receiving blocks each have shrinkage relief and deformation prevention means incorporated therein for subdividing said block into sub-blocks each holding one leg of a said staple and being of sufficiently small volume as to resist deformation from shrinkage during cooling after molding.

9. The improvement to a joint construction of claim 8 wherein:

said shrinkage relief and deformation prevention means comprising a longitudinal bore in each of said staple receiving blocks.

10. The improvement to a joint construction of claim 8 wherein:

said shrinkage relief and deformation prevention means comprises a longitudinal slot in each of said staple receiving blocks.

11. In a housing including members each composed of first and second planar sheets of plastic, a solventless joint construction for the joining of the members at respective edges thereof at right angles to one another comprising:

(a) a first lip extending along the edge to be joined of the first planar sheet at right angles thereto, said first lip having an inner edge joined to the first sheet and an outer edge opposite said inner edge thereof;

(b) a second lip extending along the edge to be joined of the second planar sheet at right angles thereto, said second lip having an inner edge joined to the second sheet and an outer edge opposite said inner edge thereof, said first and second edges being abutted with said first lip abutting the second sheet and with said inner and outer edges of said second lip parallel to said outer edge of said first lip;

(c) a plurality of guide pins extended outward from said first lip along the length thereof and perpendicular thereto;

(d) a plurality of guide pin receiving blocks disposed between said second lip and the second sheet along the length of the edge thereof, said guide pin receiving blocks each being disposed to be opposite one of said guide pins when the first and second edges are abutted with said first lip abutting the second sheet and with said inner and outer edges of said second lip parallel to said outer edge of said first lip, said guide pin receiving blocks each having a guide pin receiving bore therein aligned with and having a respective one of said guide pins therein;

(e) a plurality of staple receiving blocks disposed intermediate said guide pins behind said first lip of the first sheet along the length of the edge thereof, said staple receiving blocks being sized to receive and hold the legs of a U-shaped staple therein;

(f) a plurality of staple gun alignment guides disposed between said second lip of the second sheet along the length of the edge thereof, said staple gun alignment guides each being disposed to be opposite one of said staple receiving blocks when the first and second edges are abutted with said first lip abutting the second sheet and with said inner and outer edges of said second lip parallel to said outer edge of said first lip, said staple gun alignment guides being positioned to receive and contact the sides and inner end of a staple gun and position said gun to insert a staple into a said staple receiving block disposed opposite thereto in horizontal and vertical alignment therewith; and, (g) a plurality of U-shaped staples disposed with the legs thereof passing through the second lip and into respective ones of said staple receiving blocks.

12. The solventless joint construction for a housing of claim 11 wherein:

said staple receiving blocks each have shrinkage relief and deformation prevention means incorporated therein for subdividing said block into sub-blocks each holding one leg of a said staple and being of sufficiently small volume as to resist deformation from shrinkage during cooling after molding.

13. The solventless joint constructon for a housing of claim 12 wherein:

said shrinkage relief and deformation prevention means comprises a longitudinal bore in each of said staple receiving blocks.

14. The solventless joint construction for a housing of claim 12 wherein:

said shrinkage relief and deformation prevention means comprises a longitudinal slot in each of said staple receiving blocks.

* * * * *